United States Patent [19]
Paquette et al.

[11] Patent Number: 5,581,649
[45] Date of Patent: Dec. 3, 1996

[54] FIXED VALUE FIBER OPTIC ATTENUATOR WITH INDEX MATCHING MATERIAL

[75] Inventors: Stanley V. Paquette, Dracut; Karl J. Jalbert, Amesbury, both of Mass.; Thomas E. Simmons, Jr., Milford; Michael S. Beard, Nashua, both of N.H.; Deborah L. St. Armand, Tyngsborough, Mass.

[73] Assignee: The Whitaker Corporation, Wilmington, Del.

[21] Appl. No.: 430,611

[22] Filed: Apr. 28, 1995

[51] Int. Cl.⁶ ............................................. G02B 6/26
[52] U.S. Cl. ............................ 385/140; 385/27; 385/32
[58] Field of Search ................................ 385/15, 27, 39, 385/51, 140, 32

[56] References Cited

U.S. PATENT DOCUMENTS

| | | | |
|---|---|---|---|
| 4,257,671 | 3/1981 | Barbaudy et al. | 385/140 X |
| 5,109,468 | 4/1992 | Tamulevich et al. | 385/140 |
| 5,243,681 | 9/1993 | Bowen et al. | 385/140 |

*Primary Examiner*—John D. Lee

[57] ABSTRACT

A fiber optic attenuator having a predetermined, fixed attenuation value and low back reflection properties across a broad wavelength spectrum is disclosed. Attenuation is achieved by providing an optical fiber pathway having an attenuation region which causes a predetermined signal loss. The medium defining the pathway is of a substantially constant index of refraction through the device to minimize or eliminate interference caused by Fresnel reflections. An index matching material surrounds the area of attenuation to eliminate or minimize modal or cladding noise.

19 Claims, 4 Drawing Sheets

FIXED VALUE FIBER OPTIC ATTENUATOR WITH INDEX MATCHING MATERIAL

FIELD OF THE INVENTION

This invention relates to a detector capable fiber optic attenuator having low back-reflection properties, a fixed attenuation factor across a broad wavelength spectrum and a material surrounding the fiber optic attenuator having an index of refraction substantially the same as that of the cladding of the fiber optic segment.

BACKGROUND OF THE INVENTION

Optical fiber transmission systems often require that the signal carried through the system be reduced or attenuated before it can be used. Such attenuation generally is carried out using either an attenuator that can be adjusted in situ to provide a desired attenuation level, or in the alternative, by using an attenuator having a fixed, predetermined attenuation factor that is selected prior to use for the specific application. The latter type of attenuator is referred to herein as a "fixed value fiber optic attenuator". The majority of the fixed value attenuators currently used in fiber optic transmission systems rely upon passive filters, air gaps, optical wedges and/or lenses to reduce the signal strength in optical transmission lines.

With increasing data transmission speeds, a phenomenon referred to as "back-reflection" or "return loss" has been identified as causing significant losses in signal strength and quality. The phenomenon is characterized by Fresnel reflections which occur when light is transmitted from a first region having one index of refraction to a second region having a different index of refraction.

Current optical fiber attenuators generally operate by employing materials having refraction indices that differ from the refraction index of the optical transmission fiber to thereby cause a reduction in optical signal strength. Thus, back-reflection, and its resultant signal deterioration, is an inherent characteristic of most attenuation systems currently in use.

In addition, most of the attenuators used in fiber optic transmission systems rely upon materials that provide a differing degree of attenuation for differing wavelengths of light. Thus, it becomes necessary to identify the wavelengths to be utilized in the transmission system prior to selecting the specific attenuators. Otherwise, if the wavelengths carried through the system vary, the attenuation will likely vary as well.

U.S. Pat. No. 5,109,468, assigned to the assignee of the present invention, is directed to a "fixed value fiber optic attenuator". The fiber optic attenuator described in that patent, as shown particularly in FIGS. 2(a)–(b) of that patent and the corresponding drawings in the present application, provides attenuation by dividing, bending or otherwise altering a fiber optic pathway having an attenuation region which causes a predetermined signal loss. However, it has been found by the inventors of the present application that even with the invention of the U.S. Pat. No. 5,109,468 a certain amount of cladding "noise" or modal "noise" is introduced. It was found that the attenuator described in U.S. Pat. No. 5,109,468 was largely of use only in those applications in which the hardwared attenuated fiber shown in FIG. 1 (28) could be used in optical power transmission of the same fiber type as the attenuated fiber 28 and that the attenuator was largely signal wavelength dependent. Thus, if the hardwared attenuated fiber shown in FIG. 1 of the patent were used in the fiber optic power transmission system having a detector side optic fiber of core diameter larger than that of the attenuated fiber, cladding modes located in the cladding could be transmitted into the core of the larger diameter fiber, thereby allowing more of the power transmission through the fiber optic transmission system than the hardwared attenuator fiber was originally designed to attenuate. In the device described in the above patent, the cut fiber of FIG. 2(a) and the microbent (or stressed) fiber shown in FIG. 2(b) introduce a controlled amount of "cladding light" to effectively attenuate the power transmission through the fiber's core. Typically, these cladding light modes are stripped out when an additional length of single mode fiber (core diameter approximately 9 micrometers) is added to the detector side of the system.

Because of the introduction of cladding modes in a single mode fiber of the device shown in the above patent, a length of singlemode type fiber (ranging from one-third meter to two meters in length typically) is required to effectively "strip out" these cladding modes, allowing the detector to "see" only the core mode. It is these deficiencies of the prior art device described in U.S. Pat. No. 5,109,468 that the present invention attempts to overcome.

SUMMARY AND OBJECTS OF THE INVENTION

It is one object of the present invention to provide an attenuator for use in optical fiber transmission systems in which back-reflection losses are reduced or eliminated.

It is another object of the present invention to provide an attenuator which exhibits a fixed attenuation value across a broad spectrum of signal wavelengths.

It is still another object of the invention to provide an attenuator having an index of refraction that is substantially matched to that of the optical fiber transmission system within which the attenuator is used.

It is another object of the invention to provide an attenuator in which signal attenuation is accomplished by altering the path of the signal across the attenuator.

It is yet another object of the invention to provide an attenuator which eliminates cladding or modal noise by matching the index of refraction of the cladding of the fiber with that of a material which has the same (or substantially the same) index of refraction, by surrounding the attenuated area and the adjacent areas of the fiber segment of the optical fiber with the material.

It is yet another objective of the invention to provide a bidirectional attenuator which accepts power input from any direction without degradation of the optical signal.

It is yet another objective of the invention to prevent deterioration of the optical signal when the attenuator is placed in close proximity to a detector.

The present invention relates to fixed value fiber optic attenuators that minimize or eliminate back-reflection and is based upon the disclosure of U.S. Pat. No. 5,109,468, assigned to the assignee of the present invention. These attenuators employ an optical fiber that defines a light path through the device and contains a discontinuity that reduces the intensity of the light signal passing through the attenuator. The fiber is selected to have an index of refraction that is the same or very close to that of the optical fiber transmission system within which the attenuator is used. Since the refraction indices are substantially matched, Freznel reflections are greatly reduced, and deterioration of signal quality is therefore significantly reduced.

Unlike most conventional attenuators, in which attenuation is the result of passing light across regions having different indices of refraction, the present invention operates by providing a discontinuity in the light path through the attenuator. The discontinuity is contained in a fiber segment having an index of refraction that approximates or equals that of the fibers in the transmission system to thereby minimize back reflection in the attenuation region.

In one embodiment of the invention, the optical fiber that defines the light path through the device includes at least one small bend to cause a stress in the optical fiber leading to a constant, identifiable signal reduction. In a second embodiment of the invention, the light path is defined by two optical fibers which are substantially in axial alignment. The fibers have ends which are adjacent one another and slightly offset in the radial direction. The offset is small enough so that at least a portion of the end of one fiber is aligned with a portion of the end of a second fiber. The light signal is attenuated at the portions of the fiber which, as a result of the offset, are not aligned with the adjacent fiber end thereby causing only partial transmission of the signal.

Since, in each embodiment, the attenuation is accomplished by altering the light path rather than by absorbing light of a specific wavelength, the attenuation value is a constant across a broad spectrum. Additionally, by maintaining a substantially constant refraction index across the device and by matching the refraction index of the attenuating fiber and attenuation region to that of the system within which the attenuator is employed, back-reflection losses are significantly reduced. With the addition of the index matching material of the present invention to the attenuation region and to the adjacent areas, back reflection losses and modal noise are effectively eliminated.

DESCRIPTION OF THE PREFERRED EMBODIMENTS

Figure 1:
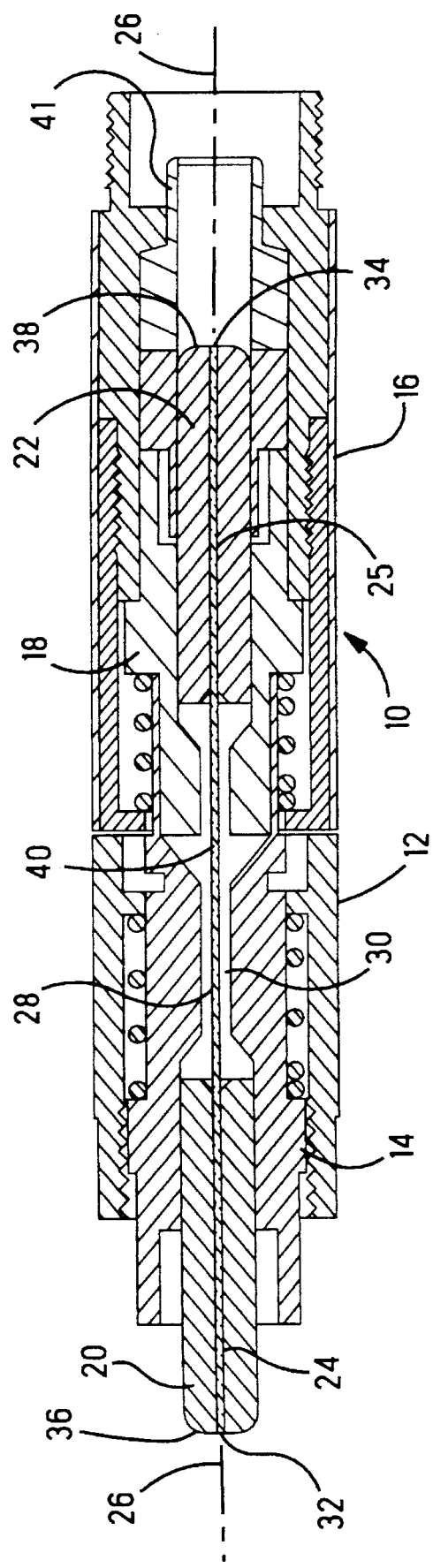
FIG. 1 is an elevational, sectional view of one embodiment of a prior art in-line fixed value fiber optic attenuator.

FIG. 1 depicts one embodiment of a prior art fixed value fiber optic attenuator of the type described in U.S. Pat. No. 5,109,468. In FIG. 1, the attenuator 10 comprises a first housing 12 containing a female connector body 14 and a second housing 16 containing a male connector body 18. A first ferrule 20 is mounted within the female connector body 14 and a second ferrule 22 is mounted within the male connector body 18. The first and second ferrules each have an axial fiber channel 24, 25 respectively, which runs along the central axis 26 of the attenuator. As can be appreciated from FIG. 4, the attenuator shown in that figure is symmetrical, meaning that the source or light or power may be introduced either from one end or the other end of the attenuator. This results in the attenuator being bidirectional and thus able to attenuate light without the loss or deterioration of the signal, despite the direction of source of such light. An optical fiber pathway 28 comprising an optical fiber segment passes through the axial fiber channels 24 and 25 of ferrules 20 and 22 and through a passageway 30 between the ferrules. The ends 32, 34 of the fiber pathway 28 are terminated flush with exterior ends 36, 38 of ferrules 20 and 22 respectively, and are polished to allow transmission of light through the fiber pathway 28.

Fiber pathway 28 includes an attenuation region 40 within passageway 30. The attenuation region 40 is shown in greater detail in FIGS. 2(a) and 2(b). FIG. 2(a) depicts one embodiment of an attenuation region of the attenuator of the present invention in which attenuation is achieved by partial transmission of the signal passing through the attenuation region. In FIG. 2(a), the optical fiber pathway 28 comprises first and second fiber segments 42 and 44. The segments have been joined at fiber junction 46, however, they have been radially offset slightly to provide a light junction 48 and offset faces 50 and 52. The offset distance is small enough to allow a portion of the distal end of the first fiber segment 42 to be in linear alignment with a portion of the proximal end of the second fiber segment 44.

The first and second fiber segments 42 and 44 can either be directly fused together, or in the alternative, they can be maintained in contact or near contact using an adhesive that has an index of refraction that approximates that of the fiber segments. For example, when Corning SMF 28 or equivalent optical fiber is used as the attenuating fiber, an index matching adhesive such as, for example, a difunctional fluoroepoxy can be used to join the severed fiber ends.

Since the segments are offset, a light signal traveling through first segment 42 can only enter second segment 44 through light junction 48. The portion of the signal exiting segment 42 which is not in alignment with light junction 48 will be lost, thereby producing the desired attenuation. The area of the light junction 48 varies inversely with the amount of offset. Thus, by providing a greater offset between the fibers, the attenuation across the attenuation region will increase. Since the fiber segments are either fused or joined with an index matching adhesive, back reflection losses and interference, resulting from Fresnel reflections will be reduced. However, the inventors have found that the index matching adhesive disclosed in U.S. Pat. No. 5,109,468 alone does not provide the degree of elimination of cladding noise desirable in applications to which the present invention is applied, such as in detector and broadband applications.

Figure 2B:
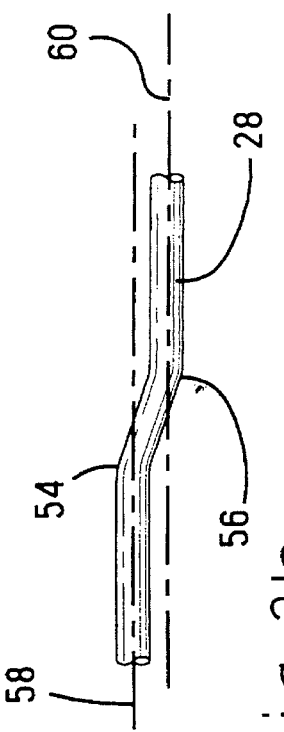
FIGS. 2(a) and 2(b) are schematic representations of two preferred embodiments of optical fiber discontinuities of a fixed value fiber optic attenuator used in the present invention.
Figure 2A:
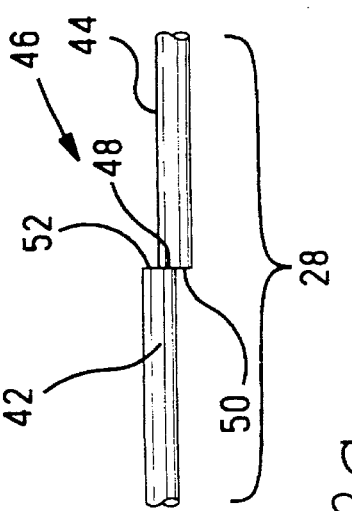

FIG. 2(b) depicts an alternate fiber configuration in the attenuation region. In FIG. 2(b), the fiber pathway 28 is distorted by a pair of bends 54, 56 which cause a slight misalignment or offset of the central axes 58, 60 of the fiber pathway 28 on either side of the bends. By increasing the distance Δ of offset between the axes 58, 60 on opposite sides of the bends, a preselected attenuation value can be achieved. In a preferred embodiment, the axes 58, 60 are maintained in a substantially axial relationship with the offset distance Δ being no greater than the diameter of the optical fiber which defines the optical fiber pathway 28. It is noted that the embodiment of FIG. 2(b) is not intended to be limited to an optical fiber having two bends. Rather, this embodiment requires only that at least one bend be used to cause the attenuation across the optical fiber pathway. As before, the index of refraction across the attenuation region is a constant.

The embodiments of FIGS. 2(a) and 2(b) are both characterized in that they contain discontinuities which cause an attenuation of a signal carried through the fiber, while minimizing back-reflection by providing a signal transmission medium having a constant index of refraction. Accordingly, the embodiments of FIGS. 2(a) and 2(b) are intended to be representative examples of a fixed value attenuation means that reduces the strength of a signal carried by an optical fiber without causing the signal to traverse regions having differing indices of refraction.

The attenuator can have any of a wide variety of terminal configurations on either side of the optical fiber pathway 28 containing the attenuation region 40. For example, the attenuator 10 depicted in FIG. 1 is an in-line style device having the exterior end 36 of one ferrule 20 extending beyond the housing 12 for mating with a female connector on a first fiber optic cable or device (not shown). The opposite end of the attenuator 10 comprises a female connector 41 adapted to receive a male fitting mounted on the end of a second fiber optic cable or device (not shown).

Figure 3A:
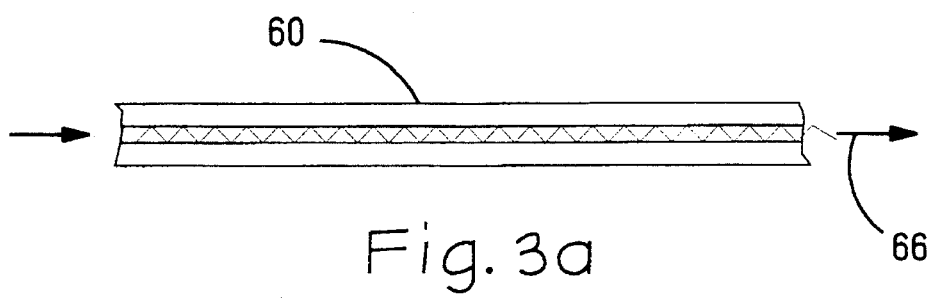
FIG. 3(a) is a sectional view of an optical fiber illustrating the propagation of light along the fiber.

FIG. 3(a) illustrates power transmission along an optical fiber 60. As can be seen in FIG. 3(a), the light is input at $P_{in}$ 62 and propagates along the reflections within the optical fiber 60. The light exits at $P_{out}$ 66 without any attenuation.

Figure 3B:
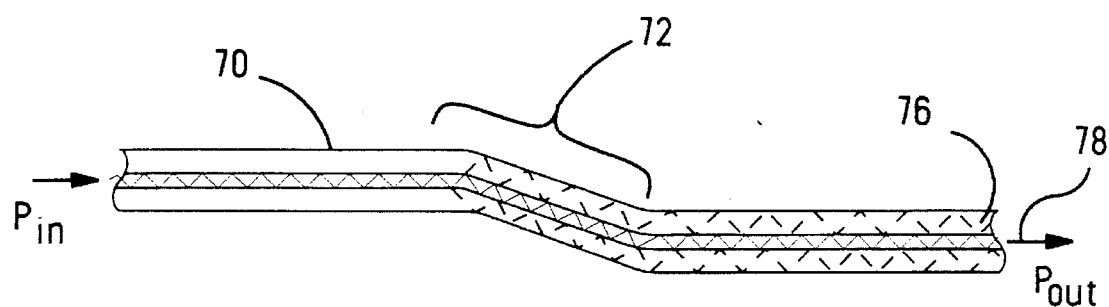
FIG. 3(b) is a sectional view of an optical fiber illustrating the propagation of cladding or modal noise.

FIG. 3(b) shows an optical fiber 70 which has a region of attenuation 72. The attenuation may be achieved in accordance with either the microbending or cutting of the optic fiber shown in FIGS. 2(a) and 2(b) of the present invention or any other method of achieving attenuation. As can be seen in FIG. 3(b), the area of attenuation introduces modal or cladding noise which propagates from the area of attenuation 72 through the optical fiber and exits along with the normal propagation $P_{out}$ 78. Cladding noise or modal noise, as referred to in the present application is a phenomenon which is a well known problem in the art to which this invention pertains and which the present invention essentially eliminates.

Figure 3C:
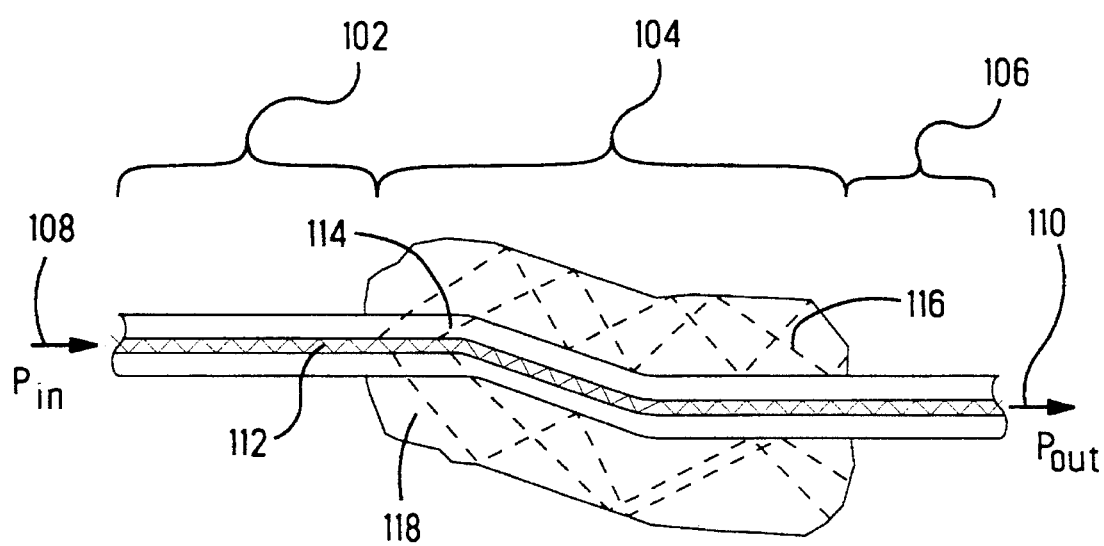
FIG. 3(c) is a sectional view of an attenuated fiber optic cable showing the reduction of induced cladding or modal noise.

FIG. 3(c) illustrates power transmission along the attenuated portion of an optical fiber. As shown in FIG. 3(c), an optical fiber 100 is divided into three sections, section 102, which is the section of the optical fiber prior to its attenuation, section 104, which represents the area of attenuation of the optical fiber caused by the optical fiber's bending, cutting or other form for producing attenuation, as disclosed above and discussed with reference, for example, to bending in FIG. 2(b), and section 106, which is the section of the optical fiber after the attenuation section. FIG. 3(c), the power in ($P_{in}$) is at reference numeral 108, power out ($P_{out}$) at reference 110. The core of the optical fiber can be made of silica glass with an index of refraction (Nd) approximately equal to 1.466. The cladding surrounding the optical fiber core may also be of silica glass with an index of refraction (Nd) approximately 1.4585. Obviously, the foregoing values are exemplary only, and other (Nd) values may be chosen, as is well known to those skilled in the art, such that if the index of refraction (Nd) is "x" for the optic fiber core, the index of refraction (Nd) of the cladding would be less than "x". As can be seen in section 102, power transmission will propagate along the optical fiber in the manner shown by waveform 112. However, when the waveform reaches the area of discontinuity 114 of the optical fiber 100, as shown in FIG. 3(c), modal noise may be introduced in that region. Modal noise results from the cladding, the index of refraction of the cladding being slightly different from that of the glass core. The cladding noise is shown by the dotted lines 116 in FIG. 3(c) and shows the undesirable optical power transmission through the cladding of the optical fiber 100. The present invention eliminates the cladding noise by surrounding the area of attenuation 104 and/or the areas adjacent to the area of attenuation (102 and/or 106) of the optical fiber with an index matching material (IMM) 118 which has substantially the same index of refraction as the cladding of the fiber 100. The material may be of liquid, colloid or solid format which "pots" or comes into contact and more or less surrounds the area of discontinuity 104 and/or its adjacent area of the hardwared attenuated optical fiber used in the attenuator shown and described in FIG. 1 of U.S. Pat. No. 5,109,468.

Thus, cladding or modal noise once located in the fiber is made to travel or relocate into the IMM 118 where the transmission of cladding noise is effectively halted. Thus, because the modal or cladding noise is damped out in the area of discontinuity and the adjacent areas, by the time power reaches past section 106 of the fiber, all of the cladding noise has been eliminated or reduced substantially.

The material surrounding the cladding of an optical fiber will also protect and insulate it from the environment as well as absorbing the modal or cladding noise. It has been found that the material surrounding the area of attenuation should be equal to or slightly greater than or slightly less than (substantially the same as) the index of refraction of the cladding of the fiber used. It has also be found that cladding noise or modal noise now becomes confined in the region of the material, thus preventing its propagation along the fiber optic line. A number of materials are commercially available and useful as an index matching material. Such materials include an index matching gel called "NYEGEL", available from Nye Lubricants, of Bedford, Mass., a gel/epoxy called "Epotek 328" available from Epoxy Technology, Inc., of Billerica, Mass., and materials named 305, 183-M or 628-M available from Dymax Corporation, of Torrington, Conn. Applicants have found that one or more of these gels, which have an index of refraction of the same or slightly greater than or slightly less than that of the cladding, when surrounding the area of attenuation of an optical fiber eliminate cladding or modal noise. However, it is recognized that other suitable gels or other materials, solid and liquid, known to those skilled in the art which match or approximately match the index of the cladding may be utilized in the present invention.

Figure 4:
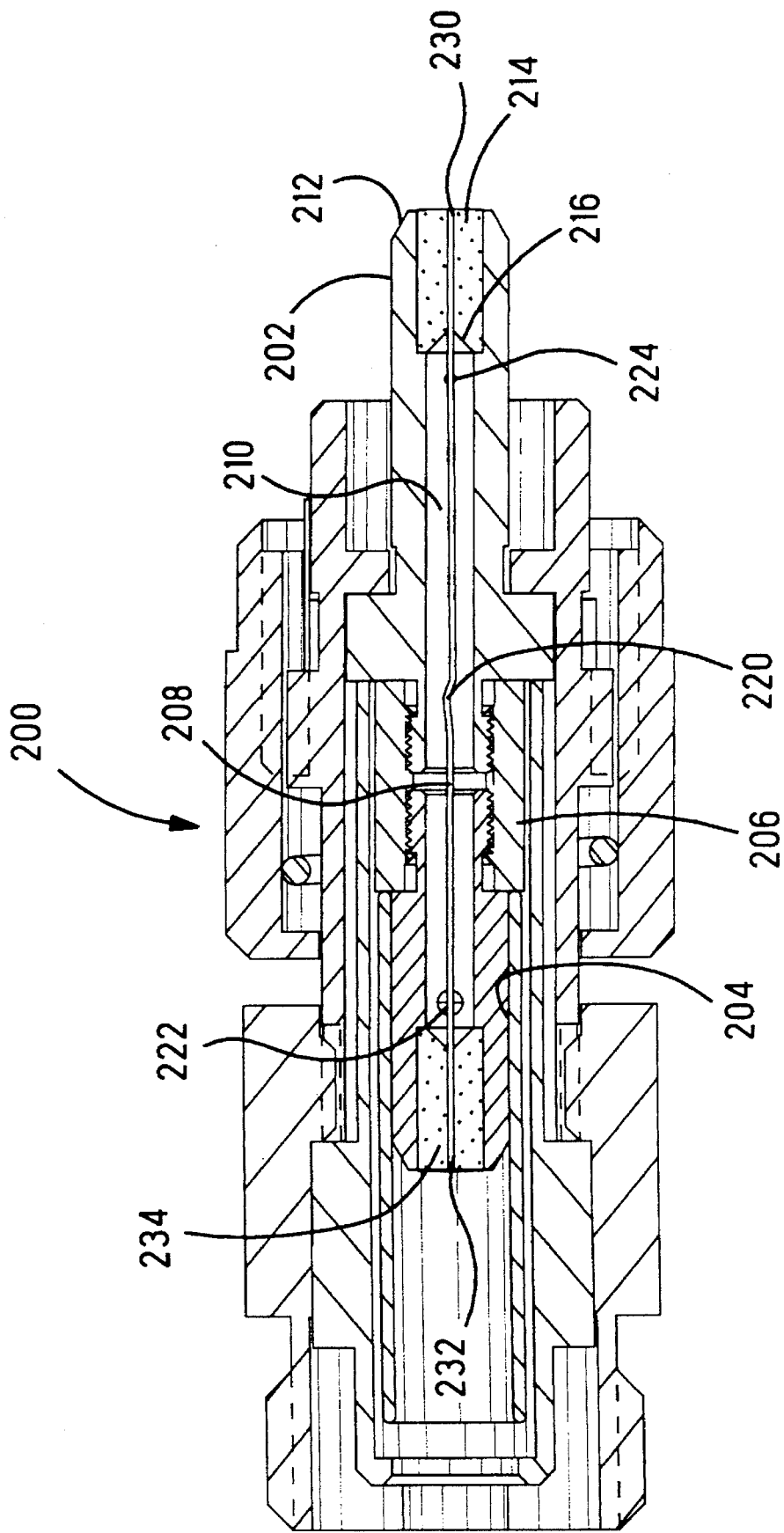
FIG. 4 is an elevational, sectional view of one embodiment of the fixed value fiber optic attenuator of the present invention.

FIG. 4 illustrates one form of an optical attenuator of the type shown in the prior art FIG. 1 attenuator, but specially suited for introduction and containment of the IMM. The attenuator 200 includes two ferrules 202 and 204. Each of these ferrules is joined by a connector ferrule 206. An optical fiber 208 passes through the interior 210 of each ferrules 202, 204 and 206. Ferrule 202 has an end 212 and an insert 214. While ferrule 202 is preferably constructed of a metallic material, insert 214 is preferably made from a ceramic material and has a conical portion 216 to allow for easy insertion of an optical fiber through the insert 214. The interior 210 is formed within ferrules 202, 204 and 206 when they are joined by suitable well known means and is made to contain the IMM described above. As is to be understood with respect to the fiber of FIG. 1, fiber 208 of FIG. 4 has a discontinuity or attenuation portion 220 which is well within the interior portion 210. Thus, the discontinuity and attenuation portion 220 and/or the adjacent fiber portions is surrounded by the IMM disclosed in reference to FIGS. 3(b)

and (c) above. Since in the normal assembly of The ferrules 202, 204 and 206 access to the interior 210 of the ferrules is substantially eliminated, some method had to be found to allow for injection and filling of the interior 210 with the IMM. Furthermore, this method must be performed prior to assembling the ferrules within the housing 200.

A preferred method of injecting index matching material into space 210 is to bore or form two holes through the ferrules into the interior 210. One hole 222 may act as a fill hole while another hole 224 at the opposite end of the ferrule assembly can act as an air bleed/overflow hole. In this method, the IMM may be injected by well known techniques through the fill hole 222 and gradually fill the interior 210 of the ferrules while allowing air and excess material to flow out of bleed hole 224. In addition, an epoxy, such as 353 nd from EPO-TEK, may be injected into the through holes 230 and 232 in the inserts 214 and 234 at either end of the ferrule assembly. It is to be understood that other suitable epoxies and other adhesives (such as a thermoplastic or a cyancacrylate) known to those skilled in the art may be utilized for the above stated purposes. This seals around the optical fiber 208 placed within the assembled ferrule. The epoxy chosen to fill the passages 230 and 234 should be of a different index of refraction than the index matching material and preferably opaque to block out any transmitted light that may be present in the IMM, thus, insuring that the IMM confines the light to the interior 210 and prevents transmission along the interior 210 and out of either or both of the passages 230 and 234. While the preferred method of injecting the index matching material is to inject it into a fill hole, other methods, such as assembling ferrules into which the IMM has already been injected may also be performed. Other injection and assembly systems are well within the knowledge of those skilled in the art.

Thus, there has been provided an improved fixed value fiber optic attenuator which includes an IMM to damp out or absorb modal or cladding noise which may be present in the region of attenuation of an optical fiber. Various other designs may be included in which the ferrule may be totally assembled of a nonmetallic and preferably ceramic material, but in each instance the attenuator would include a surrounding of the attenuated portion of the optical fiber with an IMM to substantially eliminate modal or cladding noise.

As mentioned above, the attenuator of FIGS. 2(a) and 2(b) introduce a controlled amount of "cladding light" to effectively attenuate the power transmission through the fiber's core, and that the present invention reduces such cladding light. In the prior art, these cladding light modes were stripped out by adding an additional length of single mode fiber to the detector side of the system, also as discussed above. In the present invention, the attenuator may be placed less than two meters from the detector without causing any modal interference or optical degrading, thus eliminating the need for the length of single mode fiber. Samples of attenuators made in accordance with the disclosure of the present invention, using the microbent optic fiber described with respect to FIG. 2(b) and the general attenuator structure of FIG. 4 were made and tested. The attenuator samples were tested both ways—with a length of single mode fiber between the attenuator and a photodetector, as well as without such single mode fiber between the attenuator and detector. For example, one of the samples made as described above at 5 dB value at 1300 nm light source produced 5.06 dB using a single mode fiber and 4.99 dB using no single mode fiber, thus demonstrating the ability of the attenuator of the present invention to prevent modal interference and optical degradation.

Figure 5:
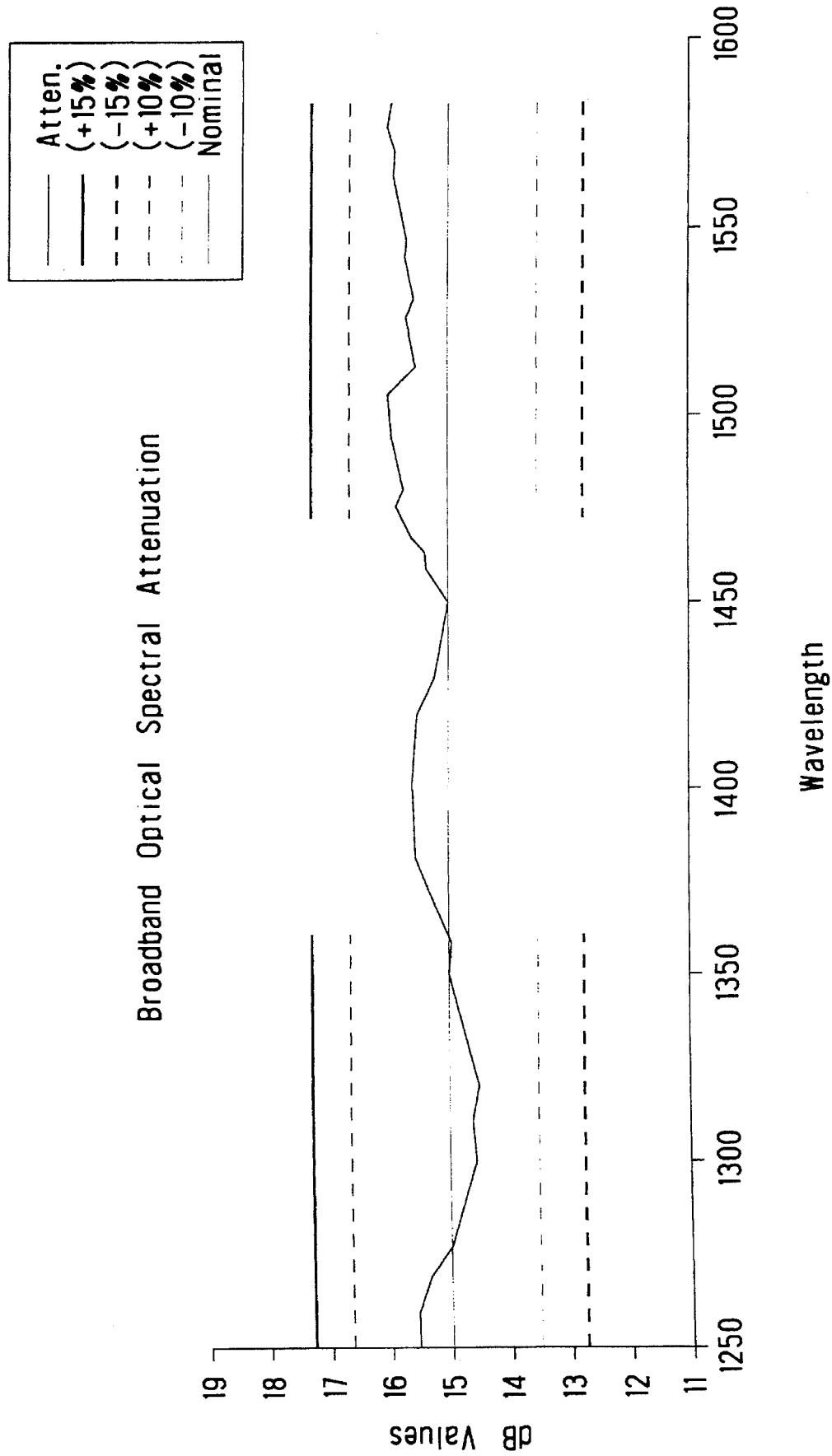
FIG. 5 is a graph illustrating broadband optical spectral attenuation using the attenuator of the present invention.

FIG. 5 is a graph which illustrates broadband optical spectral attenuation from the results of tests performed on the attenuator designed and constructed in accordance with the disclosure of the present invention and as generally shown in FIG. 4. The graph of FIG. 5 illustrates the optical performance of attenuation of an in-line attenuator when tested across the broadband optical spectrum of 1250 nm to 1600 nm.

While there have been shown and described what are at present believed to be the preferred embodiments of the invention, such embodiments are presented by way of example only and are not intended to limit the scope of the invention. Rather, it will be apparent to those skilled in the art that various changes and modifications can be made to the invention described herein without departing from the scope of the invention as defined by the claims presented herein, and their equivalents.

What is claimed is:

1. A fixed value fiber optic attenuator comprising:
  a) an optical fiber pathway defining a light path therethrough and comprising an optical fiber segment having at least one non-attenuating region and at least one fixed value attenuating region, the optical fiber segment comprising a core having a first index of refraction surrounded by a cladding having a second index of refraction; and
  b) an index matching material surrounding the cladding at least in the attenuating region, the index matching material having an index of refraction substantially the same as that of the cladding wherein the index matching material dissipates cladding noise when light passes through the attenuating region.

2. The fixed value fiber optic attenuator of claim 1 wherein the index matching material comprises a gel material, the index matching material surrounding the regions adjacent to the attenuating region.

3. The fixed value fiber optic attenuator of claim 1 wherein the fiber optical segment comprises a stressed region of the optical fiber segment which defines the attenuation region.

4. The fixed value fiber optic attenuator of claim 1, wherein the attenuator is contained in a housing, the housing comprising first and second ferrules joined together at one end of each ferrule, the joined ferrules defining a space within which the attenuator is contained.

5. The fixed value fiber optic attenuator of claim 4, wherein at least one of the first and second ferrules has a through hole formed from the exterior of the ferrule to the space defined by the first and second ferrules, the through hole permitting the introduction of the index matching material into the space.

6. The fixed value fiber optic attenuator of claim 5, wherein a second through hole is formed in one of the first and second ferrules, and wherein one of the through holes is utilized as an introduction hole and the second hole is utilized as an overfill hole to ensure filling of the space with the index matching material.

7. The fixed value fiber optic attenuator of claim 4, wherein each of the first and the second ferrules has a through aperture formed at the other end of each of the first and second ferrules, the first and second apertures communicating with the space within which the attenuator is contained.

8. The fixed value fiber optic attenuator of claim 7, wherein the portion of the optical fiber segment having the non-attenuating region communicates with each of the apertures, whereby the attenuator is bidirectional such that fiber optic transmission may be introduced through either of the apertures.

9. The fixed value fiber optic attenuator of claim 8, wherein said 1st and 2nd ferrules are constructed of a metallic material and at least one of the through apertures comprises a ceramic insert in the metallic material in the end of the ferrule.

10. The fixed value fiber optic attenuator of claim 8, wherein said 1st and 2nd ferrules are constructed of a metallic material and at least one of the ends of the ferrule comprises a ceramic material containing the through aperture.

11. The fixed value fiber optic attenuator of claim 8, wherein the portion of the optical fiber segment communicating with each of the apertures is secured in the apertures with an opaque material, the opaque material preventing the escape of cladding noise from the housing.

12. The fixed value fiber optic attenuator of claim 1 wherein the fiber optical segment comprises at least one bend, the bend defining the attenuation region.

13. The fixed value fiber optic attenuator of claim 1 wherein the optical fiber pathway comprises first and second optical fibers aligned in a substantially axial relationship, wherein the distal end of the first fiber is located adjacent to the proximal end of the second fiber, the ends being radially offset by a distance small enough to allow a portion of the distal end of the first fiber to be in linear alignment with a portion of the proximal end of the second fiber.

14. The fixed value fiber optic attenuator of claim 13, wherein the ends of the first and second fibers are maintained in alignment by an adhesive having an index of refraction approximating that of the core of the fibers.

15. The fixed value fiber optic attenuator of claim 13, wherein the distal end of the first optical fiber is fused to the proximal end of the second optical fiber.

16. The fixed value fiber optic attenuator of claim 1 wherein the index matching material comprises a solid material.

17. The fixed value fiber optic attenuator of claim 1 wherein the index matching material comprises a liquid material.

18. The fixed value fiber optic attenuator of claim 1 wherein the index matching material comprises a colloid material.

19. A method of reducing cladding noise in a fixed value fiber optic attenuator for use in an optical fiber transmission system, the attenuator comprising an optical fiber pathway defining a light path therethrough and comprising an optical fiber segment having at least one non-attenuating region and at least one fixed value attenuating region, the optical fiber segment comprising a core having a first index of refraction surrounded by a cladding having a second index of refraction, the method comprising the step of providing an index matching material surrounding the cladding at least in one of the attenuating region or the region adjacent to the attenuating region, the index matching material having an index of refraction substantially the same as that of the cladding, and further comprising the step of passing light through the light path, the index matching material absorbing cladding noise through the attenuator.

\* \* \* \* \*